United States Patent Office 3,523,878
Patented Aug. 11, 1970

3,523,878
ISOMERIZATION OF 1,4-DIENES WITH ULTRA-VIOLET RADIATION
Robert Junior Harder and Howard Ensign Simmons, Jr., Wilmington, Del., assignors to E. I. du Pont de Nemours and Company, Wilmington, Del., a corporation of Delaware
No Drawing. Filed Aug. 1, 1967, Ser. No. 657,485
Int. Cl. B01j 1/10
U.S. Cl. 204—162                                      7 Claims

ABSTRACT OF THE DISCLOSURE

A process for geometrically isomerizing a 1,4-diene which is not at its isomeric equilibrium composition and thereby bringing it closer to its equilibrium composition which comprises mixing the 1,4-diene with a promoter and exposing the mixture to radiation having a wave length of 250–400 millimicrons.

BACKGROUND OF THE INVENTION

Alpha-olefin elastomers are of increasing importance today. Particularly valuable are the copolymers containing sulfur-curable side-chain unsaturation resulting from incorporation of non-conjugated diene units. U.S. Pat. 2,933,480 to Gresham et al., describes representative copolymers of this type. Non-conjugated dienes useful in making these copolymers include 1,4-hexadiene itself and derivatives wherein the monomer still has one terminal vinyl group, e.g., 4-methyl-1,4-hexadiene. Other 1,4-diene-containing elastomers are also important, for example, the copolymer prepared by copolymerizing isobutylene with 2-alkyl-1,4-hexadienes in the presence of a cationic catalyst, e.g., A Friedel-Crafts catalyst such as boron trifluoride or stannic chloride-water.

Various catalysts are known for use in synthsizing 1,4-dienes from α-monoolefins and conjugated dienes. Japanese patent publication 8,052/66 discloses making predominantly cis-1,4-dienes with a $$CoX_2(R_2PCH_2CH_2PR_2)_2$$

aluminum trialkyl catalyst where X is halogen and R is alkyl or phenyl. Predominantly trans-1,4-hexadiene can be prepared by reacting ethylene and 1,3-butadiene in the presence of the rhodium chloride catalyst disclosed in U.S. Pat. 3,013,066 to Alderson.

In the preparation of some copolymers in which a 1,4-diene is one of the monomers used, it is sometimes advantageous to use either the cis or trans geometric isomer; however, the other isomer may be more readily available. For example, it is often desirable to use trans 1,4-hexadiene in the preparation of certain hydrocarbon copolymers, yet under certain conditions the cis isomer is more economically obtainable. In view of these circumstances, a process for isomerizing one geometric 1,4-diene isomer to the other would be highly desirable.

It is known in the art to geometrically isomerize certain diolefins, e.g. the cyclic diolefin, cyclotetradeca-1,8-diene, by irradiation in the presence of a promoter; see Moussebois and Dale, J. Chem. Soc. of London 260–267, 1966. Prior to the present invention however, a method for isomerizing cis or trans 1,4-dienes to the other geometric isomer has not been reported.

SUMMARY

According to this invention a process is provided for geometrically isomerizing a 1,4-diene having an isomer ratio not at its equilibrium composition to a 1,4-diene isomeric mixture closer to its equilibrium composition which comprises exposing the 1,4-diene to ultra-violet light having a wave length of about 250–400 millimicrons in the presence of a promoter, which promoter is a sulfide of the formula, $Q_1(S)_mQ_2$ in which $n$ is 1–6; and $Q_1$ and $Q_2$ are independently aryl, alkaryl, aralkyl or alkyl and wherein each Q group can bear at least one substituent from the group consisting of halo and alkoxy, with the proviso that at least one of the Q groups is aryl or alkaryl, an aromatic halide of the formula, $Y(X)_m$ wherein Y is an aromatic radical, which can be substituted with alkyl or alkoxy groups, $m$ is at least 1 and X is bromo or iodo; or an organic bromide of the formula,

in which R and R' are independently cycloalkyl, alkaryl, aralkyl, alkyl, aryl, bromo, or hydrogen and wherein each group R and R' can bear at least one of the substituents, alkoxy and halo.

DETAILED DESCRIPTION

The term "1,4-diene" as used herein represents a diolefin which contains the structure,

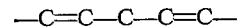

as in, for example, 1,4-hexadiene and 2,5-heptadiene. The term "geometric isomerization" is used in its conventional sense to represent the interconversion of the configurations of the atoms of a diene about either or both of the diene double bonds. For example, in the case of 1,4-hexadiene, two geometric isomers exist, the cis structure:

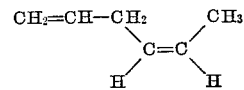

and the trans structure:

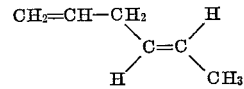

which are interconvertible under the conditions of the process of this invention.

It should be understood that each 1,4-diene under consideration has a geometric isomer equilibrium composition which means there is a particular geometric isomer mixture of that diene in which the components are present in a state of greatest isomer stability and lowest free energy as will be readily understood by one skilled in the art. The process of this invention is applied to a 1,4-diene isomer or isomeric mixture which is not at its equilibrium composition to bring it closer to or even all the way to this composition. For example, as applied to 1,4-hexadiene which has an equilibrium composition of approximately 70% trans-isomer and 30% cis-isomer, the process of this invention operates on either of the pure isomers or any isomeric mixture not at the equilibrium composition and effects isomerization until the equilibrium composition is reached. The pure isomers can be separated if desired at this time as herein after described. The process may of course be stopped prior to the time that the equilibrium composition is reached, if desired.

The process of this invention can be used to isomerize any geometrically isomerizable 1,4-diene which is not at its equilibrium composition. The term "geometrically isomerizable" is meant to include any 1,4-diene which can have more than one configuration or spatial arrangement around either or both double bonds of the 1,4-diene.

Representative geometrically isomerizable, 1,4-dienes which can be isomerized according to this invention are those corresponding to the formula:

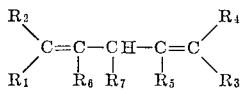

wherein each R group ($R_1$, $R_2$, $R_3$, $R_4$, $R_5$, $R_6$ and $R_7$) is independently hydrogen; $C_1$–$C_{18}$ alkyl; $C_3$–$C_8$ cycloalkyl; $C_1$–$C_{18}$ substituted alkyl wherein the substituents are halo and/or $C_1$–$C_{12}$ alkoxy; $C_6$–$C_{15}$ aryl; $C_7$–$C_{18}$ alkaryl; $C_7$–$C_{18}$ aralkyl; $C_1$–$C_{12}$ alkoxy; halo or one of the pairs $R_1$–$R_2$ or $R_3$–$R_4$ is joined together to form an aliphatic ring containing about 3–8 carbon atoms; with the proviso that $R_1$ is not the same as $R_2$ when $R_3$=$R_4$ and $R_3$ is not the same as $R_4$ when $R_1$=$R_2$.

Representative 1,4-dienes are 1,4-hexadiene; 3,3,6-tribromo-1,4-hexadiene; 6-bromo-1,4-hexadiene; 1,4-heptadiene; 4-ethyl-1,4-hexadiene; 1,4-octadiene; 1,4-nonadiene; 1,4-decadiene; 3-ethyl-1,4-octadiene; 2,6-dimethyl-2,5-octadiene; 1,4-undecadiene; 4-methyl-1,4-decadiene; 1,4-tetradecadiene; 1-phenyl-1,4-hexadiene; 4,6-dibromo-1,4-hexadiene; 3,6-dichloro-2,5-dimethyl-1,4-hexadiene; 2,3,5-trimethyl-1,4-heptadiene; 6-methyl-4-propyl-1,4-nonadiene; 2,5-heptadiene; and 3,6-dodecadiene.

The promoters which are useful in this invention include: (a) sulfides of the formula, $Q_1(S)_nQ_2$ wherein $n$ is 1–6, and each Q group is independently $C_6$–$C_{15}$ aryl, $C_7$–$C_{18}$ alkaryl, $C_1$–$C_{12}$ alkyl or $C_7$–$C_{18}$ aralkyl with the proviso that at least the one Q group is aryl or alkaryl. Each of the Q groups can bear one or more substituents from the group consisting of chloro, bromo, or $C_1$–$C_{12}$ alkoxy; (b) aromatic halides of the formula, $Y(X)_m$, wherein X is bromo and/or iodo; $m$ is an integer 1 or greater; and Y is a $C_6$–$C_{15}$ aromatic radical, a $C_7$–$C_{18}$ alkyl-substituted aromatic radical or a $C_7$–$C_{18}$ alkoxy-substituted aromatic radical, each of said radicals having $m$ hydrogens replaced with the iodo and/or bromo substituents; (c) an organic bromide of the formula

wherein R and R' are each independently hydrogen, bromo, $C_1$–$C_{12}$ alkyl, $C_3$–$C_8$ cycloalkyl, $C_7$–$C_{18}$ alkaryl, $C_7$–$C_{18}$ aralkyl or $C_5$–$C_{15}$ aryl, each of which radicals can bear one or more of the substituents, $C_1$–$C_{12}$ alkoxy, chloro and bromo. The promoters of class (a) in which the groups $Q_1$ and $Q_2$ are aryl and $n$=2 are preferred because of the fast reaction rates which they promote with minimum by-product formation. The amount of promoter required varies with the activity of the particular promoter used. Generally, for the isomerization to proceed at a practical rate, a promoter to 1,4-diene weight ratio of at least 1:100 is necessary. The promoters are effective when used in much larger amounts, e.g. at weight percents equal to or greater than that of the diene, but economics usually dictate that as small amount as possible be used. In the case of the preferred promoter, diphenyl disulfide, a promoter to 1,4-diene weight ratio of about 1:10 produces excellent results.

Representative promoters useful in this invention include diphenyl sulfide, diphenyl disulfide, butylphenyl disulfide, diphenyl tetrasulfide, bromobenzene, iodobenzene, p-dibromobenzene, diphenyl dibromo methane, tetrabromomethane, 2,2-dibromopropane, di-o-tolyl disulfide, p-bromophenyl disulfide, p-bromotoluene, di-p-ethylphenyl disulfide, 1,2,4-tribromobenzene, p-bromodiphenyl, and di-o-chlorophenyl trisulfide.

The process of this invention is carried out by exposing the 1,4-diene to be isomerized and the promoter to radiation having a wave length of about 250–400 millimicrons.

When radiation having a wave length shorter than 250 millimicrons is used, significant undesirable side reactions occur and at wave lengths above about 400 millimicrons, the isomerization rate is too slow to be practical. Radiation having a wave length of about 300–400 millimicrons is preferred because it promotes rapid isomerization without appreciable side reactions. A light filter is usually used to tray out any radiation having a wave length shorter than 250 millimicrons. The exact radiation wave length to be used for optimum results depends on the promoter used and can be ascertained in each case by determining the region of the light spectrum at which radiation is most strongly absorbed by the promoter. For a discussion of general radiation techniques useful in the practice of this invention see Molecular Photochemistry, N. J. Turro, W. A. Benjamin, Inc., New York, N.Y., 1965, pages 176–182, 246–252.

Any light source which provides radiation of a wave length within the range indicated above can be used. The efficiency of the process can be increased by increasing the intensity of the radiation. The intensity of radiation can be maximized for a given output by arranging the light source in proximity to the 1,4-diene container and directing as much of the emitted light as possible into the diene. A particularly preferred method is to employ an internal light source in which the source is placed within a transparent container and the container is immersed in the solution being irradiated.

In carrying out the isomerization process of this invention the 1,4-diene-promoter mixture can be directly exposed to the radiation treatment. However, since side reactions are minimized when the diene is in solution, it is preferred to dissolve the 1,4-diene in solvent and expose the resulting solution to the radiation. Representative suitable solvents include aromatic and aliphatic hydrocarbons such as benzene, toluene, naphthalene, cyclohexane and octane; and brominated hydrocarbons such as bromobenzene. The 1,4-diene can be present in very dilute solutions e.g., 1% by weight based on the total weight of solvent and 1,4-diene to very concentrated solutions in which the solvent is saturated with 1,4-diene. After the reaction is completed, the promoter and solvent can be removed from the product by fractional distillation or selective extraction.

The temperature and pressure at which the process is carried out can vary over a wide range. For most promoters the temperature can vary from just above the freezing point of the solvent (if used) or diene to an upper limit above which significant evaporation of the solvent or diene occurs. When promoters of the formula $Q_1$—$S_n$—$Q_2$ are used, it is preferred that the temperature be below 175° C. The reaction is usually performed at atmospheric pressure. The length of time during which the 1,4-diene is exposed to the radiation treatment will vary depending on the degree of isomerization desired, the intensity of the radiation and the activity of the promoter, and will usually range from a few minutes to several hours.

After the isomerization has proceeded to the point desired, the cis and trans isomers can be substantially separated by conventional techniques such as gas chromatography or conversion of the 1,4-dienes to chemical derivatives followed by separation of the derivatives. A typical separation involves bromination of the cis and trans 1,4-diene mixture to obtain solid brominated derivatives. The brominated compounds are then separated by fractional crystallization from a suitable solvent such as methanol and the substantially pure isomers regenerated by treatment with zinc dust in ethanol. When the diene isomer mixture to be separated is one which previously contains bromine, gas chromatography or some other conventional method other than that described above is used.

The process of this invention provides a simple and direct method for geometric isomerization of 1,4-dienes.

It is particularly important in that it does not result in the formation of significant amounts of the more stable conjugated dienes which in many instances must be removed from the desired product prior to use.

The invention will be further illustrated by the example which follows.

EXAMPLE

This example illustrates the isomerization of cis-1,4-hexadiene to trans-1,4-hexadiene. The procedure is as follows:

A 200-milliliter cylindrical Pyrex flask fitted with a magnetic stirrer is charged with 100 milliliters of dry nitrogen-sparged benzene, 10 milliliters of nitrogen-sparged cis-1,4-hexadiene and 1 gram of diphenyl disulfide. The solution is irradiated under hydrogen with a General Electric H85A3 lamp through a Corning 0–54 filter to filter out wave lengths below 300 millimicrons for about 5.5 hours, with the lamp approximately one inch from the flask and parallel with it. The resulting solution contains trans-1,4-hexadiene in predominance over cis-1,4-hexadiene by gas chromatographic analysis.

What is claimed is:

1. A process for geometrically isomerizing a 1,4-diene having a geometric isomer ratio not at its equilibrium composition to an isomeric mixture of said 1,4-diene having an isomer ratio closer to its equilibrium composition, which comprises mixing said 1,4-diene with a promoter in proportions by weight such that there is at least about one part of promoter per 100 parts of 1,4-diene and exposing said 1,4-diene-promoter mixture to radiation having a wave length of 250–400 millimicrons, said promoter being (a) a sulfide of the formula $Q_1(S)_nQ_2$ in which $n$ is 1–6 and each Q group is independently $C_6$–$C_{15}$ aryl, $C_7$–$C_{18}$ alkaryl, $C_1$–$C_{12}$ alkyl or $C_7$–$C_{18}$ aralkyl and wherein each Q group can be substituted with at least one substituent from the group consisting of chloro, bromo and $C_1$–$C_{12}$ alkoxy, with the proviso that not more than one of the Q groups is alkyl or aralkyl; (b) aromatic halides of the formula $Y(X)_m$ wherein X is at least one of bromo or iodo, $m$ is an integer 1 or greater and Y is a $C_6$–$C_{15}$ aromatic radical, a $C_7$–$C_{18}$ alkyl-substituted aromatic radical or a $C_7$–$C_{18}$ alkoxy-substituted aromatic radical, or (c) an organic bromide of the formula

wherein R and R' are each independently hydrogen, bromo, $C_1$–$C_{12}$ alkyl, $C_3$–$C_8$ cycloalkyl, $C_7$–$C_{18}$ alkaryl, $C_7$–$C_{18}$ aralkyl or $C_6$–$C_{15}$ aryl, each of which radicals, R and R' can be substituted with at least one of the substituents from the group consisting of $C_1$–$C_{12}$ alkoxy, chloro and bromo.

2. The process of claim 1 wherein the 1,4-diene corresponds to the formula:

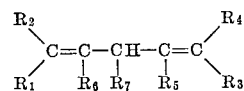

in which each R group, $R_1$–$R_7$, is independently hydrogen, $C_1$–$C_{18}$ alkyl, $C_1$–$C_{18}$ substituted alkyl in which the substituents are halo or alkoxy, $C_3$–$C_8$ cycloalkyl, $C_6$–$C_{15}$ aryl, $C_7$–$C_{18}$ alkaryl, $C_7$–$C_{18}$ aralkyl, $C_1$–$C_{12}$ alkoxy, halo or one of the pairs $R_1$–$R_2$ or $R_3$–$R_4$ is joined together to form an aliphatic ring containing about 3–8 carbon atoms, with the provisos that $R_1$ is not the same as $R_2$ when $R_3$=$R_4$ and $R_3$ is not the same as $R_4$ when $R_1$=$R_2$ and with the further proviso that when the promoter used is selected from those enumerated in class (a) the temperature of the diene-promoter mixture is below about 175° C.

3. The process of claim 2 wherein the radiation wave length is from about 300–400 millimicrons.

4. The process of claim 2 wherein the 1,4-diene is 1,4-hexadiene.

5. The process of claim 2 wherein the promoter is selected from those enumerated in group (a).

6. The process of claim 2 wherein the promoter is diphenyl disulfide and the 1,4-diene is 1,4-hexadiene.

7. The process of claim 2 wherein the 1,4-diene and promoter are in a solution containing at least about 1% by weight 1,4-diene.

References Cited

Moussebois et al.: J. Chem. Soc., © 1966, pp. 260–267.

HOWARD S. WILLIAMS, Primary Examiner

U.S. Cl. X.R.

204—158